US009172264B2

(12) United States Patent
Gonthier et al.

(10) Patent No.: US 9,172,264 B2
(45) Date of Patent: Oct. 27, 2015

(54) CAPACITOR CHARGE CIRCUIT

(71) Applicant: STMicroelectronics (TOURS) SAS, Tours (FR)

(72) Inventors: Laurent Gonthier, Tours (FR); Antoine Passal, Monnaie (FR)

(73) Assignee: STMicroelectronics (Tours) SAS, Tours (FR)

(*) Notice: Subject to any disclaimer, the term of this patent is extended or adjusted under 35 U.S.C. 154(b) by 193 days.

(21) Appl. No.: 14/013,802

(22) Filed: Aug. 29, 2013

(65) Prior Publication Data

US 2014/0062422 A1    Mar. 6, 2014

(30) Foreign Application Priority Data

Aug. 29, 2012   (FR) ..................... 12 58073

(51) Int. Cl.
| | |
|---|---|
| *H02J 7/00* | (2006.01) |
| *E06B 3/22* | (2006.01) |
| *E06B 3/263* | (2006.01) |
| *E06B 3/267* | (2006.01) |
| *E06B 3/82* | (2006.01) |
| *E06B 3/70* | (2006.01) |

(52) U.S. Cl.
CPC ................ *H02J 7/0052* (2013.01); *E06B 3/22* (2013.01); *E06B 3/267* (2013.01); *E06B 3/26305* (2013.01); *E06B 3/26345* (2013.01); *E06B 3/822* (2013.01); *E06B 2003/26312* (2013.01); *E06B 2003/26316* (2013.01); *E06B 2003/7076* (2013.01); *E06B 2003/7082* (2013.01); *Y02B 80/28* (2013.01)

(58) Field of Classification Search
CPC ...................................... H02J 7/0052
USPC ........................................ 320/166
See application file for complete search history.

(56) References Cited

U.S. PATENT DOCUMENTS

| | | | |
|---|---|---|---|
| 3,872,374 | A | 3/1975 | Rasmussen |
| 4,031,458 | A | 6/1977 | Ichikawa |
| 4,353,025 | A | 10/1982 | Dobkin |
| 4,680,536 | A | 7/1987 | Roszel et al. |
| 5,575,836 | A * | 11/1996 | Sugiura et al. ............ 96/82 |
| 6,222,356 | B1 | 4/2001 | Taghizadeh-Kaschani |
| 2010/0141231 | A1 | 6/2010 | Duchene |

FOREIGN PATENT DOCUMENTS

| | | |
|---|---|---|
| DE | 102004026896 A1 | 1/2006 |
| DE | 102010018588 A1 | 10/2011 |

OTHER PUBLICATIONS

French Search Report received in Application No. 1258072 mailed Apr. 23, 2013, 7 pages.

* cited by examiner

*Primary Examiner* — Sun Lin
(74) *Attorney, Agent, or Firm* — Slater & Matsil, L.L.P.

(57) ABSTRACT

A circuit can be used for charging a capacitor with an AC voltage. In one embodiment, the circuit includes a capacitor coupled to be charged with the AC voltage. An adjustment is configured to adjust a capacitor charge speed according to a value of the AC voltage. The adjustment circuit includes at least one bipolar transistor coupled to receive a voltage at a base of the bipolar transistor. The voltage is a function of the value of the AC voltage.

26 Claims, 2 Drawing Sheets

CAPACITOR CHARGE CIRCUIT

This application claims priority to French Patent Application No. 1258073, which was filed Aug. 29, 2012 and is incorporated herein by reference.

TECHNICAL FIELD

The present disclosure generally relates to electronic circuits and, in specific embodiments, to the field of circuits for charging a capacitor with an AC voltage. One example applies to the field of power dimmers intended to control a load powered with an AC voltage.

BACKGROUND

Some known power dimmers comprise a switch of thyristor or triac type in series with the load, the assembly receiving an AC power supply voltage. A circuit controls the switch. In operation, the switch is turned on (closed) at an intermediate stage between the beginning and the end of each positive and/or negative halfwave of the power supply voltage, by application of a start signal on its gate. Once started, the switch remains on until the end of the halfwave. By varying the time of application of the start signal, it is possible to regulate the power supplied to the load.

The switch control circuit generally comprises a capacitor charged with the AC voltage and a start circuit capable of turning on the switch when the voltage across the capacitor exceeds a threshold. A potentiometer enables the user to control the capacitor charge speed, and thus the switch starting time.

A disadvantage of existing power dimmers is that, for a given setting of the potentiometer, in case of parasitic fluctuations of the amplitude of the AC power supply voltage, the capacitor charge speed varies and the power supplied to the load accordingly also varies. In the case where the load is a lighting device, this may result in visible light intensity variations.

SUMMARY OF THE INVENTION

Embodiments of the invention allow to decrease the influence of amplitude fluctuations of the AC power supply voltage on the power supplied to the load.

For example, particular embodiments are able to decrease the influence of amplitude fluctuations of an AC voltage on the charge speed of a capacitor.

An embodiment provides a circuit for charging a capacitor with an AC voltage overcoming all or part of the disadvantages of existing charge circuits.

Another embodiment provides a power dimmer for a load powered with an AC voltage, this dimmer overcoming all or part of the disadvantages of existing dimmers.

Thus, an embodiment provides a circuit for charging a capacitor with an AC voltage, comprising a circuit for adjusting the charge speed of the capacitor according to the value of the AC voltage.

According to an embodiment, the adjustment circuit is capable of subtracting to the charge current of the capacitor an adjustment current which is a function of the value of the AC voltage.

According to an embodiment, the intensity of the adjustment current is a linear function of the value of the AC voltage.

According to an embodiment, the adjustment circuit comprises at least one bipolar transistor receiving on its base a voltage which is a function of the value of the AC voltage.

According to an embodiment, the transistor is connected in parallel to the capacitor.

Another embodiment provides a power dimmer for a load powered with an AC voltage, comprising at least one capacitor and one circuit for charging said capacitor with the AC voltage such as described hereabove.

According to an embodiment, the charge speed of said at least one capacitor conditions the power supplied to a load.

According to an embodiment, the dimmer comprises a start circuit capable of triggering the turning-on of a switch when the voltage across the capacitor exceeds a threshold.

According to an embodiment, the switch comprises at least one thyristor.

According to an embodiment, the switch comprises a triac.

According to an embodiment, the charge circuit comprises a resistive element in series with the capacitor.

Another embodiment provides a method for charging a capacitor with an AC voltage, wherein the charge speed is adjusted according to the value of the AC voltage.

According to an embodiment, an adjustment current which is a function of the value of the AC voltage is subtracted to a charge current of the capacitor.

According to an embodiment, the intensity of the adjustment current is a function of the value of the AC voltage.

BRIEF DESCRIPTION OF THE DRAWINGS

The foregoing and other features and advantages will be discussed in detail in the following non-limiting description of specific embodiments in connection with the accompanying drawings.

DETAILED DESCRIPTION OF ILLUSTRATIVE EMBODIMENTS

Figure 1:
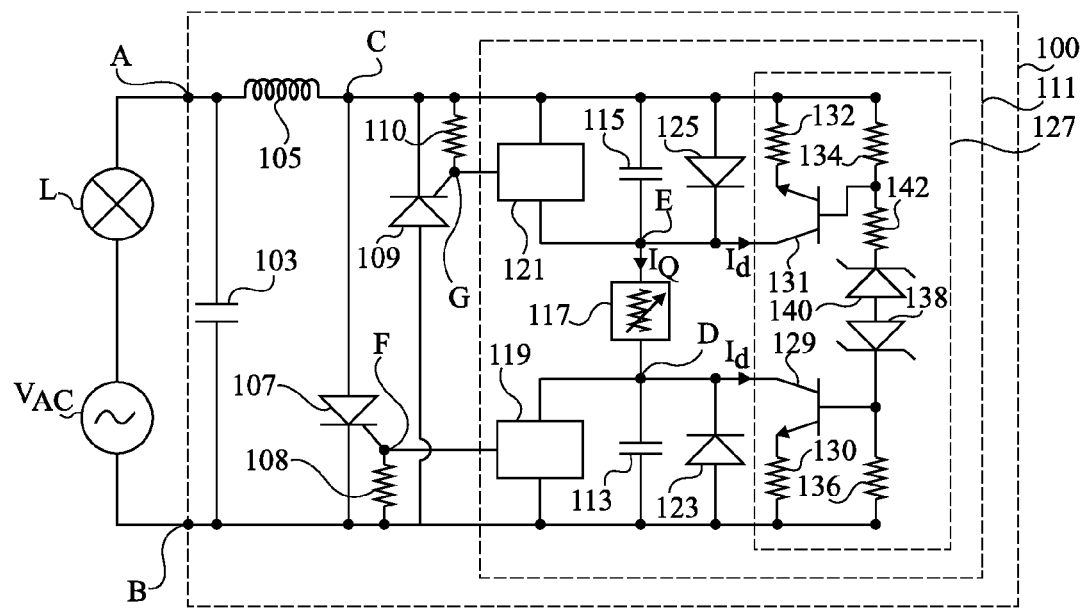
FIG. 1 is a simplified electric diagram of an assembly comprising a load powered with an AC voltage, and an embodiment of a power dimmer capable of controlling the power supplied to this load.

The same elements have been designated with the same reference numerals in the different drawings. Further, for clarity, only those elements that are useful to the understanding of the present disclosure have been shown and will be described hereafter.

FIG. 1 is a simplified electric diagram of an assembly comprising a load L powered with an AC voltage VAC. An embodiment power dimmer 100 is capable of controlling the power supplied to load L. Load L is, for example, a lighting device such as a halogen bulb, a light-emitting diode lamp, a compact fluorescent lamp, or any other lighting device capable of being powered with an AC voltage. As a variation, the load may be a heating or ventilation device, or any other device capable of being powered with an AC voltage.

AC voltage VAC is, for example, the mains voltage of the electric distribution network. In this example, dimmer 100 is assembled in series with load L via two contact terminals A and B, the assembly receiving AC voltage VAC. Terminals A and B of the dimmer are connected to a first terminal of load L and to a first terminal of provision of AC voltage VAC, a second terminal of load L being connected to a second terminal of provision of AC voltage VAC.

Dimmer 100 is a fullwave dimmer. That is, it delivers power to load L during the two positive and negative halfwaves of power supply voltage VAC.

Dimmer 100 comprises an LC filter comprising a capacitor 103 between terminals A and B, and an inductance 105 having one end connected to terminal A and its other end connected to a node C of the dimmer. The LC filter especially has the function of preventing unwanted current and/or voltage gradients (for example, current and/or voltage peaks) from propagating in the electric distribution network. As an example, capacitor 103 is directly connected to terminals A and B, and inductance 105 is directly connected to terminal A and to node C.

Dimmer 100 comprises a first thyristor 107 between node C and terminal B. The anode of thyristor 107 is on the side of node C. A second thyristor 109 is coupled in antiparallel with thyristor 107. In this example, thyristors 107 and 109 are cathode-gate thyristors. In a preferred embodiment, the anode of thyristor 107 and the cathode of thyristor 109 are directly connected to node C, and the cathode of thyristor 107 and the anode of thyristor 109 are directly connected to terminal B. A resistor 108 connects cathode gate F of thyristor 107 to terminal B and a resistor 110 connects cathode gate G of thyristor 109 to node C. In a preferred embodiment, resistors 108 and 110 are directly connected, respectively, to node F and to terminal B, and to nodes G and C.

Dimmer 100 further comprises a circuit 111 for controlling thyristors 107 and 109. Circuit 111 comprises a first capacitor 113 between terminal B and an intermediate node D of circuit 111, and a second capacitor 115 between node C and an intermediate node E of circuit 111. A resistive element 117, of variable value, for example, comprising a potentiometer, connects node D to node E. In a preferred embodiment, capacitor 113 is directly connected to node D and to terminal B, capacitor 115 is directly connected to nodes E and C, and resistive element 117 is directly connected to nodes E and D. Circuit 111 comprises reset elements for discharging capacitors 113 or 115 at the beginning of each new positive or negative halfwave of the AC voltage. The reset elements for example comprise a diode 123 between terminal B and node D, the anode of diode 123 being on the side of terminal B, and a diode 125 between node C and node E, the anode of diode 125 being on the side of node C.

In a preferred embodiment, the anode and the cathode of diode 123 are directly connected, respectively, to node B and to node D, and the anode and the cathode of diode 125 are directly connected, respectively, to node C and to node E. Circuit 111 further comprises a circuit 119 capable of starting (turning on) thyristor 107 when the voltage across capacitor 113 exceeds a threshold during a positive halfwave of voltage VAC, and a circuit 121 capable of starting (turning on) thyristor 109 when the voltage across capacitor 115 exceeds a threshold during a negative halfwave of voltage VAC. In this example, circuit 119 is connected, and preferably directly connected, to nodes D and F and to terminal B, and circuit 121 is connected, and preferably directly connected, to nodes E, C, and G.

At the beginning of a positive halfwave of voltage VAC, thyristors 107 and 109 are maintained off. The dimmer conducts a current IQ running through forward-biased diode 125 and through resistive element 117. Capacitor 113 charges under the effect of this current. When the voltage across capacitor 113 exceeds a threshold, thyristor 107 is turned on. For this purpose, start circuit 119 applies a voltage across resistor 108, that is, between node F and terminal B, to apply a current having an intensity greater than a start threshold between the cathode gate and the cathode of thyristor 107. Once started, thyristor 107 remains on until the current that it conducts becomes zero, for example, until the end of the halfwave.

The above-mentioned sequence is repeated for each positive or negative halfwave of AC voltage VAC, the only difference, for negative halfwaves, being that at the beginning of a halfwave, current IQ runs through forward-biased diode 123, and charges capacitor 115. When the voltage across capacitor 115 exceeds a threshold, thyristor 109 is turned on by start circuit 121.

By varying the value of variable resistive element 117, the charge speed of capacitors 113 and 115 can be varied, which enables to vary the turn-on times of thyristors 107 and 109. This enables the regulation of the power supplied to load L. In particular, decreasing resistance 117 amounts to advancing the turn-on time of thyristors 107 and 109, and thus to increasing the power supplied to the load. Similarly, increasing resistance 117 amounts to delaying the turn-on time of thyristors 107 and 109, and thus to decreasing the power supplied to the load.

According to an aspect of the described embodiments, control circuit 111 of dimmer 100 comprises, in addition to the already-described elements, a branch circuit 127 capable of subtracting to charge current IQ of capacitors 113 and 115 an adjustment current Id, depending on the value of AC voltage VAC.

In this example, branch circuit 127 comprises two NPN bipolar transistors 129 and 131. The collector of transistor 129 is connected, and preferably directly connected, to node D, and its emitter is connected to terminal B via an emitter resistor 130. The collector of transistor 131 is connected, and preferably directly connected, to node E, and its emitter is connected to node C via an emitter resistor 132. Circuit 127 further comprises a resistor 134 connecting the base of transistor 131 to node C, and a resistor 136 connecting the base of transistor 129 to terminal B. In this example, circuit 127 comprises two zener diodes 138 and 140 in antiseries between the base of transistor 129 and the base of transistor 131, the cathode of diode 138 being on the base side of transistor 129, and the cathode of diode 140 being on the base side of transistor 131. In this example, the cathode of diode 138 is directly connected to the base of transistor 129, the anode of diode 138 is directly connected to the anode of diode 140, and a resistor 142 connects the cathode of diode 140 to the base of transistor 131.

At the beginning of a positive halfwave of voltage VAC and of the charge phase of capacitor 113, zener diode 140 is off. The base-emitter voltage of transistor 129 is thus substantially zero, and transistor 129 is non-conductive. All of current IQ flowing through diode 125 and resistive element 117 charges capacitor 113. When voltage VAC reaches the avalanche voltage of zener diode 140, the latter becomes conductive. Calling VZ140 the avalanche voltage of diode 140, and R134, R136, and R142 the respective values of resistors 134, 136, and 142, a voltage substantially equal to (VAC−VZ140)×R136/(R136+R134+R142) is then applied between the base of transistor 129 and terminal B, which turns on transistor 129. A portion Id of current IQ is then branched by transistor 129, and no longer takes part in the charge of capacitor 113, which decreases the charge speed of capacitor 113 with respect to a dimmer comprising no branch circuit 127. Circuit 111 is sized so that transistor 129 is in its linear operation range. Since a base current substantially proportional to voltage VAC−VZ140 flows through the base-emitter junction of transistor 129, current Id branched by the transistor is also proportional to voltage VAC−VZ140, and thus is a linear function of the value of voltage VAC. The charge current of capacitor 113 is then equal to IQ−Id. When the voltage across capacitor 113 exceeds the start threshold set by circuit 119, thyristor 107 is turned on.

Similarly, during negative halfwaves, when voltage VAC reaches avalanche voltage VZ138 of zener diode 138, a current Id proportional to voltage VAC−VZ138 is subtracted to charge current IQ of capacitor 115, and drained off to terminal A via transistor 131 and inductance 105.

In other words, branch circuit 127 adjusts the charge speed of capacitors 113 and 115 according to the value of AC voltage VAC, or partly discharges capacitors 113 and 115 according to the value of AC voltage VAC. More specifically, in this example, when voltage VAC exceeds the avalanche threshold of diodes 138 and 140, circuit 127 decreases the charge speed of capacitors 113 and 115, this decrease being all the greater as the value of voltage VAC is high.

An advantage of the embodiment of FIG. 1 is that circuit 127 enables to minimize the influence of amplitude fluctuations of voltage VAC on the charge speed of capacitors 113 and 115, and thus on the power supplied to the load.

In the example of FIG. 1, the provision of zener diodes 138 and 140 enables to avoid for a current Id to be branched from the charge current of capacitors 113 and 115 from as soon as the beginning of a positive or negative halfwave of voltage VAC. This enables to minimize the power consumption of the dimmer when it is known beforehand that, whatever the setting of potentiometer 117, thyristors 107 and 109 are only started towards the end of the halfwaves of voltage VAC (for example, when the load has a low power consumption). Diodes 138 and 140 are however optional. In the absence of diodes 138 and 140, a current Id, proportional to the value of voltage VAC, is branched from the charge current of capacitors 113 and 115 from as soon as the beginning of the positive and negative halfwaves of voltage VAC.

Figure 2:
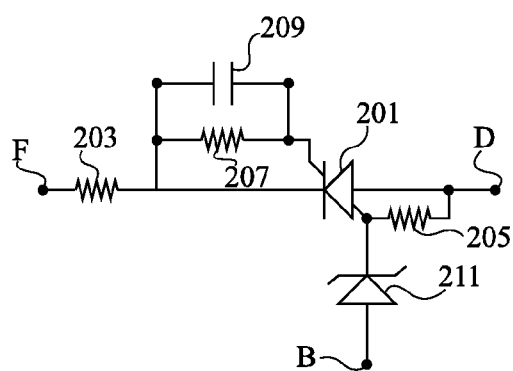
FIG. 2 is an electric diagram of an embodiment of a circuit for starting a switch of a power dimmer.

FIG. 2 is an electric diagram of an embodiment of circuit 119 for starting thyristor 107 of dimmer 100 of FIG. 1, during positive halfwaves of voltage VAC. Based on the diagram of FIG. 2, it will be within the abilities of those skilled in the art to form a similar circuit for the starting of thyristor 109 during negative halfwaves of voltage VAC (circuit 121 of dimmer 100 of FIG. 1). In this example, the start circuit comprises a thyristor 201 having its anode connected, and preferably directly connected, to node D, and having its cathode connected to node F via a resistor 203. An anode-gate resistor 205 is connected between the anode gate and the anode of thyristor 201, a cathode gate resistor 207 is connected between the cathode gate and the cathode of thyristor 201, and a capacitor 209 is connected in parallel with resistor 207, between the cathode gate and the cathode of thyristor 201. The start circuit of FIG. 2 further comprises a zener diode 211 connected between terminal B and the anode gate of thyristor 201, the anode of diode 211 being on the side of terminal B. The avalanche threshold of zener diode 211 conditions the voltage threshold across capacitor 113 at which thyristor 107 is started.

When the voltage across capacitor 113 exceeds a threshold, zener diode 211 turns on by avalanche effect, and a current flows from the anode to the anode gate of diode 211. This start current turns on thyristor 201. Once thyristor 201 has been made conductive, a current flows between the cathode gate and the cathode of thyristor 107, which turns on thyristor 107. Resistor 207 and capacitor 209 enable to improve the electromagnetic immunity of thyristor 201.

Figure 3:
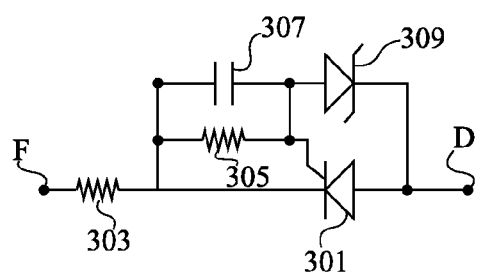
FIG. 3 is an electric diagram of another embodiment of a circuit for starting a switch of a power dimmer.

FIG. 3 is an electric diagram of another embodiment of circuit 119 for starting thyristor 107 of dimmer 100 of FIG. 1, during positive halfwaves of voltage VAC. Based on the diagram of FIG. 3, it will be within the abilities of those skilled in the art to form a similar circuit for the starting of thyristor 109 during negative halfwaves of voltage VAC (circuit 121 of dimmer 100 of FIG. 1). In this example, the start circuit comprises a thyristor 301 having its anode connected, and preferably directly connected, to node D, and having its cathode connected to node F via a resistor 303. A cathode-gate resistor 305 is connected between the cathode gate and the cathode of thyristor 301, and a capacitor 307 is connected in parallel with resistor 305, between the cathode gate and the cathode of thyristor 301. The start circuit of FIG. 2 further comprises a zener diode 309 connected between the cathode gate and node D, the cathode of diode 309 being on the side of node D. The avalanche threshold of zener diode 309 conditions the voltage threshold across capacitor 113 at which thyristor 107 is started. In the example of FIG. 3, terminal B is not connected to start circuit 119.

When the voltage across capacitor 113 exceeds a threshold, zener diode 309 becomes conductive by avalanche effect, and a current flows from the cathode gate to the cathode of thyristor 301. This start current turns on thyristor 301. Once thyristor 201 has been turned on, a current flows between the cathode gate and the cathode of thyristor 107, which turns on thyristor 107. Resistor 305 and capacitor 307 enable to improve the electromagnetic immunity of thyristor 301.

The start circuit of FIG. 3 has the advantage over the circuit of FIG. 2 of enabling to more accurately control thyristors 107 and 109. This advantage especially results from the fact that the circuit of FIG. 3 uses a cathode-gate thyristor, which is more responsive than an anode-gate thyristor. Further, in an anode-gate thyristor, the switching from the on state to the off state occurs for a value of the current flowing in the thyristor lower than in a cathode-gate thyristor, which makes the control of thyristors 107 and 109 easier.

In an embodiment of dimmer 100 of FIG. 1, start circuits 119 and 121 are formed according to the example of FIG. 3, and the values of the various components of dimmer 100 are the following: capacitor 103: 100 nanofarads, inductance 105: 29 micro-henrys, resistances 108 and 110: 10 kilo-ohms, resistances 303: 50 kilo-ohms, resistances 305: 20 kilo-ohms, resistances 307: 10 nanofarads, capacitors 113 and 115: 1 microfarad, resistances 130 and 132: 680 microfarad, resistances 134 and 136: 4.3 kilo-ohms, resistances 142: 150 kilo-ohms. Thyristors 107 and 109 for example are the components sold under reference TS820-600. Zener diodes 309 for example are the components sold under reference BZX55C15, and have an avalanche voltage on the order of 15 volts. Diodes 123 and 125 for example are the components sold under reference 1N4148. Bipolar transistors 129 and 131 for example are the components sold under reference 2N2222. Zener diodes 138 and 140 for example are the components sold under reference BZX55C68, and have an avalanche voltage on the order of 68 volts. Each thyristor 301 (or 201 in the case of the circuit of FIG. 2) may be formed by means of two thyristor-assembled bipolar transistors, for example, an NPN transistor sold under reference 2N2222 and a PNP transistor sold under reference 2N2907. Variable resistive element 117 for example comprises a potentiometer of 220 kilo-ohms in series with a first resistor of 1 kilo-ohm between nodes E and D and, in parallel with a second resistor of 82 kilo-ohms, the potentiometer wiper being connected to the node common to the potentiometer and to the first and second resistors.

The described embodiments are of course not limited to this specific example.

Figure 4:
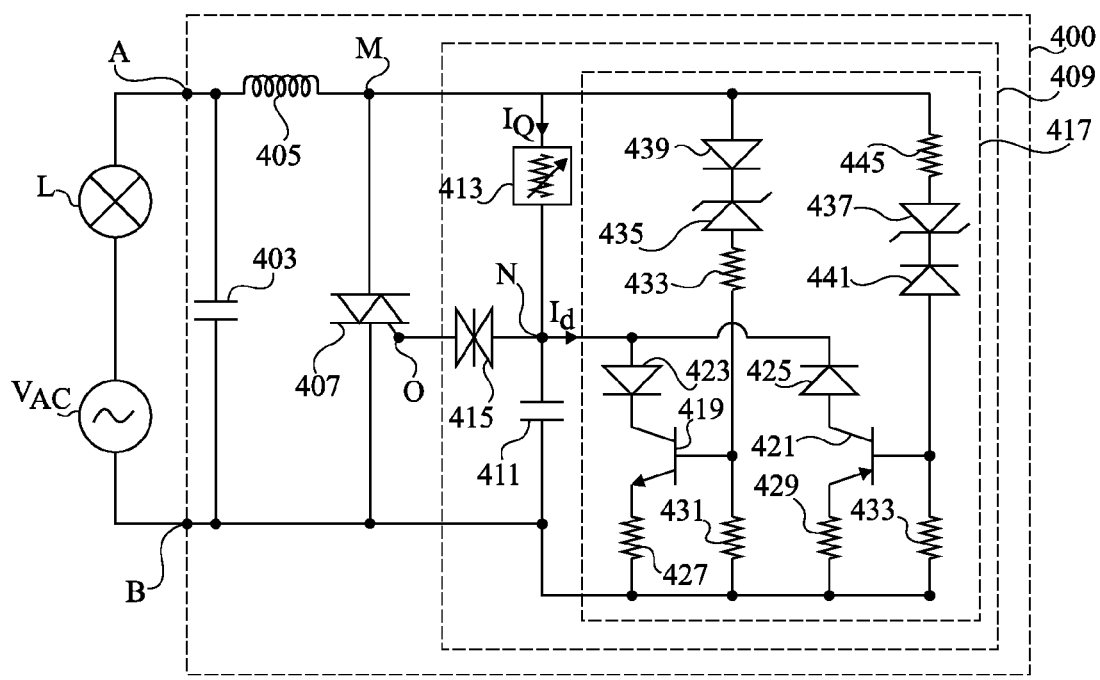
FIG. 4 is a simplified electric diagram of an assembly comprising a load powered with an AC voltage, and another embodiment of a power dimmer capable of controlling the power supplied to this load.

FIG. 4 is a simplified electric diagram of an assembly comprising a load L powered with an AC voltage VAC, and an example of another embodiment of a power dimmer 400 capable of controlling the power supplied to load L. As in the example of FIG. 1, dimmer 400 of FIG. 4 is series-assembled with load L via two contact terminals A and B, this assembly receiving AC voltage VAC. Further, as in the example of FIG. 1, dimmer 400 is a fullwave dimmer.

Dimmer 400 comprises an LC filter comprising a capacitor 403 between terminals A and B, and an inductance 405 having one end connected to terminal A and its other end connected to a node M of the dimmer. Dimmer 400 differs from dimmer 100 of FIG. 1 in that in dimmer 400, the switch used to control the power supplied to the load is a triac 407 (which replaces thyristors 107 and 109 of dimmer 100). Triac 407 is connected between node M and terminal B. Dimmer 400 comprises a circuit 409 for controlling triac 407. Circuit 409 comprises a capacitor 411 between terminal B and an intermediate node N of circuit 409. A resistive element 413 of variable value, for example comprising a potentiometer, connects node N to node M. Circuit 409 further comprises a diac 415 connected between node N and a control gate O of triac 407.

At the beginning of a positive halfwave of voltage VAC, triac 407 is maintained off. A current IQ flows through resistive element 413 and charges capacitor 411. When the voltage across capacitor 411 exceeds the start threshold of diac 415, the latter turns on and a current flows between gate O of triac 407 and terminal B. This gate current turns on triac 407. Once started, triac 407 remains on until the end of the halfwave.

The above-mentioned sequence is repeated for each positive or negative halfwave of AC voltage VAC.

According to an aspect of the described embodiment, control circuit 409 of the triac further comprises, in addition to the already-described elements, a branch circuit 417, or a circuit of partial discharge of capacitor 411 according to the value of AC voltage VAC. In this example, circuit 417 is capable of subtracting, to charge current IQ of capacitor 411, an adjustment current Id depending on the value of AC voltage VAC.

In this example, branch circuit 127 comprises an NPN bipolar transistor 419 and a PNP bipolar transistor 421. A diode 423 is connected between node N and the collector of transistor 419, the anode of diode 423 being on the side of node N, and a diode 425 is connected between the collector of transistor 421 and node N, the cathode of diode 425 being on the side of node N. The emitter of transistor 419 is connected to terminal B via an emitter resistor 427, and the emitter of transistor 421 is connected to terminal B via an emitter resistance 429. Circuit 417 further comprises a resistor 431 connecting the base of transistor 419 to terminal B, and a resistor 433 connecting the base of transistor 421 to terminal B. In this example, circuit 417 further comprises two zener diodes 435 and 437, respectively between the base of transistor 419 and node M, and between the base of transistor 421 and node M, the cathode of diode 435 being on the side of node M and the cathode of diode 437 being on the side of the base of transistor 421. In this example, a diode 439 is connected between node M and the cathode of zener diode 435, the anode of diode 439 being on the side of node M, and a diode 441 is connected between the base of transistor 421 and the cathode of zener diode 437, the anode of diode 441 being on the side of the base of transistor 421. Further, in the shown example, a resistor 443 is connected between the base of transistor 419 and the anode of zener diode 435, and a resistor 445 is connected between node M and the anode of zener diode 437.

At the beginning of a positive halfwave of voltage VAC and of the charge phase of capacitor 411, zener diode 435 is off. The base-emitter voltage of transistor 419 is thus substantially zero, and transistor 419 is non-conductive. All of current IQ flowing through diode 125 and resistive element 413 thus charges capacitor 411. When voltage VAC reaches the avalanche voltage of zener diode 435, the latter becomes conductive. A voltage substantially proportional to voltage VAC minus the avalanche voltage of diode 435 is then applied between the base of transistor 419 and terminal B, which turns on transistor 419. A portion Id of current IQ is then branched by transistor 419, and no longer contributes to the charge of capacitor 411, which decreases the charge speed of capacitor 411 with respect to a dimmer which would not comprise branch circuit 417. In this example, current Id branched by transistor 419 is proportional to the value of voltage VAC minus the avalanche voltage of diode 435. When the voltage across capacitor 411 exceeds the start threshold set by diac 415, triac 407 is turned on.

Similarly, during negative halfwaves, when voltage VAC exceeds the avalanche voltage of zener diode 437, a current Id proportional to voltage VAC minus the avalanche voltage of zener diode 437 is subtracted to charge current IQ of capacitor 411, and drained off via transistor 421.

It should be noted that in the example of FIG. 4, diodes 423, 425, 439, and 441 are optional and may be suppressed if transistors 419 and 421 are capable of withstanding a negative voltage between their collector and their emitter on the one hand, and between their emitter and their base on the other hand.

Specific embodiments have been described. Various alterations, modifications, and improvements will readily occur to those skilled in the art.

In particular, embodiments of a circuit for charging a capacitor with an AC voltage where the capacitor charge speed is adjusted according to the value of the AC voltage have been described hereabove. More specifically, embodiments have been described where the capacitor charge circuit comprises a branch circuit capable of subtracting, from the capacitor charge current, a current which depends on the value of the AC voltage, or of partially discharging the capacitor according to the value of the AC voltage. Although the present disclosure has been made in the context of a particularly advantageous use in circuits for controlling switches in power dimmers, it is not limited to this specific use. It will be within the abilities of those skilled in the art to adapt the described embodiments to any circuit for charging a capacitor with an AC voltage, where the influence of amplitude fluctuations of the AC voltage on the capacitor charge speed is desired to be minimized.

Further, the present disclosure is not limited to the above-described examples of branch or discharge circuits. Based on the above teachings, it will be within the abilities of those skilled in the art to form other circuits for charging a capacitor with an AC voltage, capable of adjusting the capacitor charge speed according to the value of the AC voltage. As an example, branch circuits enabling to subtract to the capacitor charge current an adjustment current which is a linear function of the value of the AC voltage have been described hereabove. The present disclosure is not limited to functions of this type. Further, in the described examples, the adjustment current is branched by means of bipolar transistors. The present disclosure is not limited to this specific case. Other types of branch components, for example, MOS transistors, may be used.

Further, in the case of a use in a power dimmer for a load powered with an AC voltage, the present disclosure is not limited to the shown and described examples of dimmer systems. In particular, the present disclosure is not limited to the case where the dimmer comprises an LC filter of protection against parasitic disturbances. Further, the present disclosure is not limited to dimmers using switches of thyristor or triac type. It will be within the abilities of those skilled in the art to adapt the described embodiments to dimmers using other types of switches. The present disclosure is not limited either to the above-described examples of switch starting circuits. Further, it will be within the abilities of those skilled in the art to adapt the described embodiments to halfwave dimmers.

Such alterations, modifications, and improvements are intended to be part of this disclosure, and are intended to be within the spirit and the scope of the present application. Accordingly, the foregoing description is by way of example only and is not intended to be limiting. The present application is limited only as defined in the following claims and the equivalents thereto.

What is claimed is:

1. A circuit comprising:
  a capacitor coupled to be charged with an AC voltage; and
  an adjustment circuit configured to adjust a capacitor charge speed according to a value of the AC voltage, wherein the adjustment circuit comprises a bipolar transistor receiving a voltage at a base of the bipolar transistor, the voltage being a function of the value of the AC voltage.

2. The circuit of claim 1, wherein the adjustment circuit is capable of subtracting, an adjustment current from a current for charging the capacitor, the adjustment current being a function of the value of the AC voltage.

3. The circuit of claim 2, wherein an intensity of the adjustment current is a linear function of the value of the AC voltage.

4. The circuit of claim 1, wherein the bipolar transistor is connected in parallel with the capacitor.

5. The circuit of claim 1, wherein the circuit is part of a power dimmer for a load powered with the AC voltage.

6. The circuit of claim 5, wherein the capacitor charge speed of the capacitor conditions a power supplied to the load.

7. The circuit of claim 6, further comprising a start circuit configured to trigger a turn-on of a switch when the voltage across the capacitor exceeds a threshold.

8. The circuit of claim 7, wherein the switch comprises a thyristor.

9. The circuit of claim 7, wherein the switch comprises a triac.

10. The circuit of claim 5, further comprising a resistive element in series with the capacitor.

11. A method for charging a capacitor with an AC voltage, the method comprising:
  applying the AC voltage across the capacitor; and
  while applying the AC voltage, adjusting a charge speed of charging the capacitor according to a value of the AC voltage, wherein the adjusting is accomplished by applying a voltage to a base of a bipolar transistor coupled in parallel with the capacitor, the voltage being a function of the value of the AC voltage.

12. The method of claim 11, wherein the adjusting a charge speed of charging the capacitor comprises subtracting an adjustment current from a current charging the capacitor.

13. The method of claim 12, wherein the adjustment current flows through the bipolar transistor.

14. The method of claim 12, wherein a magnitude of the adjustment current is a function of the value of the AC voltage.

15. The method of claim 14, wherein the magnitude of the adjustment current is a function of the voltage applied to the base of the bipolar transistor.

16. A circuit comprising:
  a first charging node and a second charging node, wherein a charging AC voltage can be applied between the first charging node and the second charging node;
  a capacitor coupled between the first charging node and the second charging node; and
  a transistor with a current path coupled between the first charging node and the second charging node and a control terminal configured to receive a voltage with a magnitude that is a function of the charging AC voltage.

17. The circuit of claim 16, further comprising:
  a first thyristor coupled between the first charging node and the second charging node; and
  a second thyristor coupled between the first charging node and the second charging node in antiparallel with the first thyristor.

18. The circuit of claim 17, wherein the first thyristor and the second thyristor comprise cathode-gate thyristors.

19. The circuit of claim 17, further comprising a control circuit coupled to the first thyristor and the second thyristor, the capacitor and the transistor being part of the control circuit.

20. The circuit of claim 19, wherein the control circuit comprises:
  the capacitor, which has a first terminal coupled to the second charging node and a second terminal coupled to a first intermediate node;
  a second capacitor, which has a first terminal coupled to the first charging node and a second terminal coupled to a second intermediate node; and
  a resistive element coupled between the first intermediate node and the second intermediate node.

21. The circuit of claim 20, wherein the resistive element comprises a potentiometer.

22. The circuit of claim 20, wherein the control circuit further comprises:
  a first diode coupled between the second charging node and the first intermediate node; and
  a second diode coupled between the first charging node and the second intermediate node.

23. The circuit of claim 20, wherein the control circuit further comprises:
  a start up circuit configured to turn on the first thyristor when a voltage across the capacitor exceeds a threshold during a positive halfwave of the charging AC voltage; and
  a second start up circuit configured to turn on the second thyristor when a voltage across the second capacitor exceeds a threshold during a negative halfwave of the charging AC voltage.

24. The circuit of claim 20, wherein the control circuit further comprises:
  the transistor, which has a current path coupled between the second charging node and the first intermediate node;
  a second transistor, which has a current path coupled between the first charging node and the second intermediate node;
  a first resistor coupled between a control terminal of the transistor and the second charging node; and a second resistor coupled between a control terminal of the second transistor and the first charging node.

25. The circuit of claim 24, further comprises an intermediate circuit comprising a third resistor and two zener diodes coupled in antiseries, the intermediate circuit coupled between the first resistor and the second resistor.

26. The circuit of claim 19, wherein the control circuit further comprises an adjustment circuit configured to subtract an adjustment current from a charge current of the capacitor, the adjustment current depending on a value of the charging AC voltage, wherein the transistor is part of the adjustment circuit.

* * * * *